United States Patent
Fussbroich et al.

(10) Patent No.: US 6,797,835 B2
(45) Date of Patent: Sep. 28, 2004

(54) PHOSPHOLIPID COMPOSITION AND USE OF SAME

(75) Inventors: Peter Fussbroich, Bergheim (DE); Johannes Gareiss, Cologne (DE)

(73) Assignee: American Lecithin Company, Oxsford, CT (US)

( * ) Notice: Subject to any disclaimer, the term of this patent is extended or adjusted under 35 U.S.C. 154(b) by 0 days.

(21) Appl. No.: 10/614,585

(22) Filed: Jul. 7, 2003

(65) Prior Publication Data

US 2004/0096512 A1 May 20, 2004

Related U.S. Application Data

(63) Continuation of application No. 09/871,589, filed on May 31, 2001, now abandoned.

(51) Int. Cl.$^7$ .................................................. C07F 9/02
(52) U.S. Cl. .............................. 554/80; 554/78; 554/79; 514/78; 424/489; 424/493; 424/494
(58) Field of Search .............................. 554/78, 79, 80; 514/78; 424/489, 493, 494

(56) References Cited

U.S. PATENT DOCUMENTS 3,920,857 A * 11/1975 Barker et al. ................ 426/307
4,762,658 A * 8/1988 Rothfuss et al. ............. 264/122

* cited by examiner

Primary Examiner—Deborah D. Carr
(74) Attorney, Agent, or Firm—Greenberg Traurig LLP

(57) ABSTRACT

A phospholipidic composition with an L-α-glycerophosphatidyl-choline concentration of at least 10% by weight is described, where said composition is granular and also contains, in addition to L-α-glycerophosphatidylcholine, at least one granulation aid selected from the group consisting of a monophosphate, diphosphate or triphosphate of an alkali metal or an alkaline earth metal or a mixture thereof.

20 Claims, No Drawings

PHOSPHOLIPID COMPOSITION AND USE OF SAME

This application is a continuation of application Ser. No. 09/871,589, filed May 31, 2001, now abandoned.

The present invention relates to a phospholipidic composition having the features of the generic part of patent claim 1 and use of such a phospholipidic composition.

BACKGROUND OF THE INVENTION

Phospholipid compositions with a concentration of more than 10% by weight L-α-glycerophosphatidylcholine, preferably with a glycerophosphatidylcholine concentration of approximately 30% by weight or more are known. These phospholipidic compositions are used as effective and valuable ingredients in pharmaceutical products, cosmetic preparations as well as dietary preparations because of their glycerophosphatidylcholine content. One of the main problems with such a use of these known phospholipidic compositions is that glycerophosphatidylcholine is strongly hygroscopic, so that such compositions are very difficult to handle, especially when the glycerophosphatidylcholine concentration is high, and thus storage and accurate metered addition are difficult accordingly.

To find some relief in the problem of hygroscopic properties of such phospholipidic compositions containing glycerophosphatidylcholine, it is known that glycerophosphatidylcholine or the corresponding phospholipidic composition containing glycerophosphatidylcholine may be granulated using a binder, so that this binder provides the glycerophosphatidylcholine particles with an outer coating which prevents water from gaining access to the glycerophosphatidylcholine, so that the corresponding hygroscopic properties of these phospholipidic composition are reduced. Such a granulation method is very time-consuming and energy-intensive, especially since the binder, which later forms the coating around the glycerophosphatidylcholine, is added during granulation in the form of a dilute solution. Due to the fact that overmoistening during application of the coating leads to collapse of the granular structure, the binder solution must be added slowly and cautiously, while the solvent is removed continuously at the same time.

In addition, it is known that glycerophosphatidyl solutions may be sprayed onto a sorbent carrier, said carrier having only a limited uptake capacity for glycerophosphatidylcholine without the carrier thus loaded with glycerophosphatidylcholine becoming hygroscopic itself.

Furthermore, the hygroscopic glycerophosphatidylcholine may be bound to a matrix by spray drying, in which case the substances forming the matrix are usually water soluble, so the expenditure of energy required to accomplish this is especially high, and the glycerophosphatidylcholine composition prepared in this way has only a limited glycerophosphatidylcholine concentration.

The object of the present invention is to make available a phospholipidic composition which contains glycerophosphatidylcholine and whose hygroscopic properties are decreased to such an extent that such a phospholipidic composition can be processed satisfactorily, in particular even at a high glycerophosphatidylcholine concentration,

SUMMARY OF THE INVENTION

This object is achieved according to this invention by a phospholipidic composition having the characterizing features of claim 1.

The phospholipidic composition according to this invention has a minimum glycerophosphatidylcholine concentration of at least 10% by weight, where the composition according to this invention is granular and also contains, in addition to the glycerophosphatidylcholine, a granulation aid selected from the group comprising a monophosphate, diphosphate or triphosphate of an alkali metal or an alkaline earth metal or a mixture thereof. In other words, the phospholipidic composition according to this invention in which the glycerophosphatidylcholine concentration amounts to at least 10% by weight, preferably at least 30% by weight and especially up to 80% by weight glycerophosphatidylcholine, differs from the state of the art cited in the preamble in that the composition according to this invention is not in the form of hygroscopic granules, and the granules are also mixed with at least one granulation aid selected from the group consisting of a monophosphate, diphosphate or triphosphate of an alkali metal or an alkaline earth metal or a mixture thereof.

DETAILED DESCRIPTION OF THE INVENTION

It has surprisingly been found that the specific granulation aids mentioned above (monophosphate, diphosphate or triphosphate of an alkali metal or an alkaline earth metal or a mixture thereof) which is provided in the phospholipidic composition according to this invention in addition to the at least one glycerophosphatidylcholine especially effectively and this invention in addition to the at least one glycerophosphatidylcholine especially effectively and permanently suppresses the hygroscopic properties of the granulated phospholipidic composition, especially when the composition according to this invention has a high glycerophosphatidylcholine concentration. This in turn leads to the result that the known coating of the glycerophosphatidylcholine granules can be omitted in the case of the phospholipidic composition according to this invention, because due to the addition of the aforementioned granulation aid, the result is compositions that have little or no hygroscopic property. This in turn has the result that metered addition of the composition according to this invention is very simple, even if the composition according to this invention is stored for a long period of time without special measures, e.g., without packaging under an inert gas in moisture-tight containers. Therefore, when using the composition according to this invention, it is not necessary to use flow regulating substances such as those that are always required with the known phospholipidic compositions containing glycerophosphatidylcholine. Due to the fact that in the best case the composition according to this invention has a high concentration of glycerophosphatidylcholine and contains only a small amount of granulation aid, the composition according to this invention can be processed especially, well into a variety of consecutive products, because the additives which might cause problems in such products are present only in low concentrations. This advantage is further reinforced in the composition according to this invention by the fact that the products (monophosphate, diphosphate or triphosphate of an alkali metal or an alkaline earth metal or a mixture thereof) which are present as granulation aids in the composition according to this invention have been approved worldwide, including the United States of America, according to both type and amount for use in pharmaceutical products, cosmetic preparations and food applications, and specifically also for dietetic products, whereas this is often not the case with the substances mentioned at the beginning which are present in the known phospholipidic compositions to suppress the hygroscopic properties of glycerophosphatidylcholine. Therefore, it is also understandable that the granulated phospholipidic composition according to this invention can be formulated without any additional complicated process steps to yield end products that are stable in storage, in particular granules, hard capsules or tablets. In particular, another advantage is that the production process for the phospholipidic composition according to this invention is especially simple and thus can also be carried out inexpensively and is not susceptible to problems, because in the simplest case, the components of the phospholipidic composition here can be mixed dry in a suitable mixer to form a powder mixture, after which a granulation liquid is added, preferably a low monohydric alcohol, and the moist granules thus produced then need only be dried, whereupon the granulation liquid may optionally be recovered.

With regard to the concentration of the granulation aid present in the composition according to this invention, it must be pointed out in principle that the concentration of this granulation aid depends on the concentration of glycerophosphatidylcholine in the respective preparation and in particular it also depends on which hygroscopic properties the phospholipidic composition may have in this regard. It is desirable for the composition according to this invention to have little or no hygroscopic property, so high concentrations of granulation aids are provided especially when the concentration of glycerophosphatidylcholine is high, so that between 2% by weight and 50% by weight granulation aid is provided accordingly for such compositions in which the concentration of glycerophosphatidylcholine is varied between 50% by weight and 98% by weight. Such compositions then have no hygroscopic properties at all, so that a free-flowing phospholipidic granular product is made available which can be processed satisfactorily without lumping and can also be stored without requiring any special safety measures. The composition according to this invention preferably contains the granulation aid in a minimum concentration of 2% by weight and especially between 2% by weight and 50% by weight, and it has surprisingly been found that granulation aid concentrations between 10% by weight and 30% by weight are especially suitable. Such granulation aid concentrations, i.e., concentrations between 10% by weight and 30% by weight in particular, ensure that in further processing of the granulated phospholipidic composition according to this invention to follow-up (consecutive) products, especially for use in the food industry or in the pharmaceutical industry, not too much granulation aid is present, and might yield adverse reactions with other components or active ingredients.

An especially suitable embodiment of the phospholipidic composition according to this invention provides for the granules to have a particle size between 0.063 mm and 5 mm, preferably between 1.2 mm and 3 mm, and if such a particle size is maintained, the composition according to this invention can be metered in an especially simple and reproducible manner when it is being processed to follow-up products.

To further simplify use of the granulated phospholipidic composition according to this Invention, in particular to simplify metered addition thereof, an embodiment of a composition according to this invention provides that the composition also contains cellulose and/or silicon dioxide in addition to glycerophosphatidylcholine and the granulation aids mentioned above. The cellulose concentration in the inventive composition preferably varies between 0.5% by weight and 30% by, weight, especially between 5% by weight and 20% by weight. In particular in the production of the phospholipidic composition in the embodiments described above, where the phospholipidic composition contains cellulose, the cellulose used preferably has an average particle size between 60 $\mu$m and 150 $\mu$m, preferably between 90 $\mu$m and 120 $\mu$m. Such a powdered cellulose having the particle size defined above ensures in particular that a free-flowing granular product is obtained in the granulation which is required to produce the composition according to this invention, and that the granules will remain permanently hygroscopic and can be processed without the use of flow control agents.

Another advantageous embodiment of the phospholipidic composition according to this invention provides that the phospholipidic composition also contains silicon dioxide, the concentration of this silicon dioxide in the composition varying between 0.5% by weight and 3% by weight, preferably between 1% by weight and 2% by weight. In particular, this silicon dioxide in the composition results in the production of relatively hard granules which thus have a low dust burden, and the properties of such granules are not altered even in the case of storage under extreme atmospheric humidity.

Especially when the granulated phospholipidic composition according to this invention contains the silicon dioxide described above in the concentrations mentioned above in a particle size which is preferably between 5 nm and 25 nm, especially between 10 nm and 20 nm, the properties with regard to the hardness and freedom from dust of such a composition are especially permanent, so that such a composition can be obtained very easily and simply even when the glycerophosphatidylcholine concentration is high.

In particular, a silicon dioxide having a surface area between 100 $m^2$/g and 300 $m^2$/g, preferably between 150 $m^2$/g and 250 $m^2$/g, is incorporated into the phospholipidic composition according to this invention.

As mentioned above with regard to the phospholipidic composition according to this invention, the composition according to this invention contains a granulation aid, preferably a calcium salt of phosphoric acid and in particular tricalcium phosphate as the granulation aid.

Especially when the granulated phospholipidic composition according to this invention contains tricalcium phosphate as the granulation aid, containing less than 10% by weight monocalcium phosphate and/or less than 10% by weight dicalcium phosphate, each based on the total amount of tricalcium phosphate, such a composition has extremely low hygroscopic properties so that it has an unlimited stability in storage without the risk of lumping of the granules in an undesirable manner due to uptake of moisture.

It is essentially also possible for the phospholipidic composition according to this invention to contain the traditional binders, but the phospholipidic composition according to this invention is free of the usual binders In particular, because due to the presence of the minimum of one granulation aid which is present in the composition according to this invention, its properties, in particular the hygroscopic properties, are influenced in a positive sense to such an extent that the hygroscopic properties of the glycerophosphatidylcholine are completely or almost completely suppressed by a phospholipidic composition having such a formulation.

As already described above, the composition according to this invention preferably has a relatively high concentration of glycerophosphatidylcholine, and in particular the glycerophosphatidylcholine concentration in the composition according to this invention is greater than 70% by weight and preferably varies between 80% by weight and 95% by weight. In other words, this invention thus makes available a phospholipidic composition having a high glycerophosphatidylcholine concentration, whereby surprisingly due to the use of low concentrations of the above-mentioned special granulation aids, the hygroscopic properties of the glycerophosphatidylcholine are effectively and permanently suppressed, thus making available free-flowing compositions which can thus be metered reproducibly and are suitable for use in pharmaceutical preparations, food preparations and cosmetic preparations in particular or for the production of derivatives of glycerophosphatidylcholine.

An especially suitable special embodiment of the phospholipidic composition according to this invention provides for the composition to contain:

10 to 80% by weight glycerophosphatidylcholine,
0 to 40% by weight cellulose,
0.5 to 50% by weight calcium monophosphate, calcium diphosphate and/or calcium triphosphate, and
0.5 to 3% by weight silicon dioxide.

However, it is desirable for the phospholipidic composition according to this invention to be in the form of a hard product which has a high glycerophosphatidylcholine content and is easy to process, can be used in a variety of ways, so another special embodiment of the composition according to this invention has a formulation comprising:

40 to 70% by weight glycerophosphatidylcholine,
10 to 30% by weight cellulose,
10 to 30% by weight calcium monophosphate, calcium diphosphate and/or in particular calcium triphosphate, and
1.5 to 2.5% by weight silicon dioxide Such a composition is free-flowing even without the use of other additives and can be metered in a reproducible manner, in particular by weighing, so that it can be used to produce a variety of end products in the cosmetic, pharmaceutical or food industries.

Glycerophosphatidylcholine in the present description refers in particular to L-α-glycerophosphatidylcholine which is also referred to as (R)-1,2-glycero-3-phosphatidylcholine. In addition, the term glycerophosphatidylcholine as used here also includes derivatives of glycerophosphatidylcholine, n particular the ethers and esters of glycerophosphatidylcholine, in particular in so far as these derivatives are hygroscopic. However, the granulated phospholipidic composition according to this invention contains in particular an L-α-glycerophosphatidylcholine which is derived from a vegetable source and is isolated from soybeans in particular.

As already explained repeatedly above, the phospholipidic composition according to this invention can be used in particular in foods, cosmetics or pharmaceutical products. Due to the fact that the phospholipidic composition according to this invention is in the form of a relatively stable granular product which has a high hardness and low dust burden while on the other hand having little or no hygroscopic property, the phospholipidic composition according to this invention can be metered in an especially reproducible and dust-free manner and it has an extremely great stability in storage, so that even when stored in relatively high atmospheric humidity, there is little or no increase in weight and no lumping, which is also regarded as another special advantage of the composition according to this invention. Due to the fact that the composition according to this invention has the above-mentioned ingredients as granulation aids which are approved internationally in terms of both type and quantity for use in foods, pharmaceutical products and cosmetic products, there are no problems in using the composition according to this invention for the production of pharmaceutical or cosmetic preparations or for the production of dietary products, foods and/or food supplements, so that the composition according to this invention can be used in a variety of ways.

The composition according to this invention is explained in greater detail below on several embodiments.

Production Procedure for Examples 1 till 4

The components indicated in the examples were mixed dry as powdered ingredients in a Diosna P25 mixer (Diosna company, Germany) and mixed there at a rate of rotation, step 1, for a mixing time of three minutes.

After the mixing time, a homogeneous powdered mixture was obtained.

While the mixer was running, 25% by weight ethanol was added to the mixture, which was then followed by another mixing time of three minutes.

After this additional mixing time, the moist granules thus prepared were dried in a cabinet shelf dryer until no more ethanol could be detected in the granules.

Then the granules prepared in this way were screened using a 16 mesh screen (U.S. Bureau of Standards).

Examples 1 till 5

The ingredients listed in Table 1 were used to produce Examples 1 till 5. Example 5 is used only for the sake of comparison because it does not contain any granulation aid based on tricalcium phosphate.

TABLE 1

| | Example | | | | |
|---|---|---|---|---|---|
| | 1 | 2 | 3 | 4 | 5 |
| Ingredients | in % by weight | | | | |
| Glycerophosphatidylcholine | 50 | 60 | 70 | 90 | 90 |
| Cellulose | 25 | 25 | 15 | 2 | 5 |
| Tricalcium phosphate | 18 | 10 | 10 | 6 | — |
| Silicon dioxide | 7 | 5 | 5 | 2 | 5 |

Glycerophosphatidylcholine in Table 1 is L-α-glycerophosphatidylcholine isolated from soybeans, purity at least 95% by weight glycerophosphatidylcholine, melting point 230–245° C.

Cellulose in Table 1 is microcrystalline, purified and partially depolymerized cellulose with an average particle size of 100 μm.

Tricalcium phosphate in Table 1 is a tricalcium phosphate containing a maximum of 10% by weight monocalcium phosphate and a maximum of 10% by weight dicalcium phosphate.

Silicon dioxide in Table 1 is a highly dispersed silicon dioxide with an average particle size of 15 nm and a surface area of 200 $m^2/g$.

Of the granules produced according to the production procedure given above, the increase in weight, which can be regarded as a measure of the hygroscopic properties, was measured after the periods of time indicated (one day, seven days, three months), during time which the granular specimens used for the test were stored uncovered in a standard climate, i.e., at 65% relative atmospheric humidity and 20° C. The results of the weight gain in percent by weight (% by weight) after a corresponding storage are shown in Table 2.

TABLE 2

| Example | Weight gain in % by weight after a storage time of | | |
|---|---|---|---|
| | 1 day | 7 days | 3 months |
| 1 | 0.2 | 0.4 | 1 |
| 2 | 0.3 | 0.5 | 1.5 |
| 3 | 0.3 | 0.6 | 1.8 |
| 4 | 0.5 | 0.7 | 1.9 |
| 5 | 4 | 6 | 12 |

With regard to the granules according to Example 5, it should be pointed out that these granules were already showing significant lumping and had lost their free-flowing property after just seven days, so they were no longer suitable for further use. The other granules according to Examples 1–4 did not show these changes, so these granules remained unchanged even after a storage time of three months.

What is claimed is:

1. A phospholipidic composition, whereby said composition is a granulate, said composition containing L-α-glycerophosphatidylcholine in a concentration of at least 10% by weight and at least one granulation aid selected from the group consisting of a monophosphate, diphosphate or triphosphate of an alkali metal, an alkaline earth metal, and a mixture thereof.

2. The phospholipidic composition of claim 1, wherein the composition contains the granulation aid in a concentration between 2% by weight and 50% by weight.

3. The phospholipidic composition of claim 1, wherein the composition contains the granulation aid in a concentration between 10% by weight and 30% by weight.

4. The phospholipidic composition of claim 1, wherein the granules have a particle size between 0.063 mm and 5 mm.

5. The phospholipidic composition of claim 1, wherein at least one of cellulose and silicon dioxide is present in the composition.

6. The phospholipidic composition of claim 5, wherein the cellulose concentration in the composition is between 0.5% by weight and 30% by weight.

7. The phospholipidic composition of claim 6, wherein the cellulose concentration in the composition is between 5% by weight and 20% by weight.

8. The phospholipidic composition of claim 5, wherein the cellulose has an average particle size between 60 μm and 150 μm.

9. The phospholipidic composition of claim 5, wherein the silicon dioxide concentration in the composition varies between 0.5% by weight and 3% by weight.

10. The phospholipidic composition of claim 5, wherein the silicon dioxide has a particle size between 5 nm and 25 nm.

11. The phospholipidic composition of claim 5, wherein the silicon dioxide has a surface area between 100 $m^2/g$ and 300 $m^2/g$.

12. The phospholipidic composition of claim 1, wherein the composition contains at least one calcium salt of phosphoric acid as a granulation aid.

13. The phospholipidic composition of claim 12, wherein the calcium salt of phosphoric acid is tricalcium phosphate.

14. The phospholipidic composition of claim 13, wherein the tricalcium phosphate contains at least one of less than 10% by weight monocalcium phosphate and less than 10% by weight dicalcium phosphate, each based on the total amount of said tricalcium phosphate.

15. The phospholipidic composition of claim 1, wherein the composition is free of binders.

16. The phospholipidic composition of claim 1, wherein the concentration of L-α-glycerophosphatidylcholine in the composition is greater than 70% by weight.

17. The phospholipidic composition of claim 16, wherein the concentration of L-α-glycerophosphatidylcholine in the composition is between 80% by weight and 95% by weight.

18. The phospholipidic composition of claim 1, wherein the composition contains:

10 to 80% by weight L-α-glycerophosphatidylcholine;

0 to 40% by weight cellulose;

0.5 to 50% by weight of at least one of calcium monophosphate, calcium diphosphate and calcium triphosphate; and 0.5 to 3% by weight silicon dioxide.

19. The phospholipidic composition of claim 18, wherein the composition contains:

40 to 70% by weight L-α-glycerophosphatidylcholine;

10 to 30% by weight cellulose;

10 to 30% by weight of at least one of calcium monophosphate, calcium diphosphate and calcium triphosphate; and 1.5 to 2.5% by weight silicon dioxide.

20. The phospholipidic composition of claim 1, wherein the L-α-glycerophosphatidylcholine is of vegetable origin.

* * * * *